United States Patent [19]

Rice et al.

[11] Patent Number: 5,156,904
[45] Date of Patent: Oct. 20, 1992

[54] POLYMERIC FILM COATED IN-LINE WITH POLYETHYLENEIMINE

[75] Inventors: Sandra W. Rice, Greer, S.C.; David Rudd, Naples, N.C.

[73] Assignee: Hoechst Celanese Corporation, Somerville, N.J.

[21] Appl. No.: 525,017

[22] Filed: May 18, 1990

[51] Int. Cl.$^5$ .......................... B32B 27/08; B32B 27/32
[52] U.S. Cl. ...................................... 428/219; 428/412; 428/476.9; 428/483; 428/516; 428/910; 264/175
[58] Field of Search ..................... 428/219, 412, 476.9, 428/483, 516, 910

[56] References Cited

U.S. PATENT DOCUMENTS

| | | | |
|---|---|---|---|
| Re. 28,554 | 9/1975 | Curler et al. | 428/334 |
| 3,033,707 | 5/1962 | Lacy | 428/215 |
| 3,230,135 | 1/1966 | Hurst | 428/421 |
| 3,297,476 | 1/1967 | Kane | 428/457 |
| 3,322,553 | 5/1967 | Seifried et al. | 428/334 |
| 4,139,643 | 2/1979 | Hix et al. | 426/122 |
| 4,208,468 | 6/1980 | Cunningham et al. | 428/483 |
| 4,410,600 | 10/1983 | McGrail | 428/483 |
| 4,571,363 | 2/1986 | Culbertson | 428/332 |

FOREIGN PATENT DOCUMENTS

| | | |
|---|---|---|
| 0362568 | 11/1990 | European Pat. Off. |
| 424216 | 11/1967 | Switzerland |
| 913289 | 12/1962 | United Kingdom |
| 1169806 | 11/1969 | United Kingdom |
| 4111564 | 10/1985 | United Kingdom |

Primary Examiner—P. C. Sluby
Attorney, Agent, or Firm—Gregory N. Clements

[57] ABSTRACT

Oriented polymeric film coated with polyethyleneimine is disclosed, in which the polyethyleneimine is coated in-line, i.e., during the film manufacturing process for forming the polymeric film and before heat setting the film. In-line polyethyleneimine coated polymeric film, when used to make a laminate with other polymers such as polyethylene or ionomer type polymers, shows no signs of delamination between the polymeric film and the extrusion coated polymer after 2 hours in water at 121° C. at 15 psi. In-line coating polyethyleneimine on the polymeric film can occur before any orientation of the polymeric film, during interdraw, with respect to biaxially oriented film, or after orienting the film, so long as the coating occurs before heat setting the film. The preferred polymeric film is polyethylene terephthalate.

5 Claims, No Drawings

POLYMERIC FILM COATED IN-LINE WITH POLYETHYLENEIMINE

BACKGROUND OF THE INVENTION

1) Field Of The Invention

The present invention relates to oriented polymeric film coated on at least one side with an aqueous based polyethyleneimine primer coating composition. In particular, the present invention concerns oriented polymeric film coated in-line with an aqueous based polyethyleneimine, which renders the film more receptive to direct extrusion coating with other polymer layers, and to ink adhesion.

2) Prior Art

Oriented polymeric film, and particularly biaxially oriented polyethylene terephthalate (PET) film, has been widely used in packaging materials, magnetic tape applications, glazing applications, and reprographic film applications. It has good optical clarity and toughness which renders the film extremely suitable for these applications.

A major use of polymeric film is in lamination with other polymers. Often polyester film is extrusion coated with polyethylene, for example, to provide heat sealing or other properties not possible with polyester alone. Unfortunately, unprimed polymeric film is not very receptive to extrusion coating with other polymers. Most polymeric film is substantially inert and adhesion between the unprimed polymeric film and other extrusion coated polymers is poor.

Numerous primer coatings are known in the field for application to polymeric film to improve the adhesion of the film to various polymeric materials. Examples of such coatings include compositions based on vinylidene chloride polymers (U.S. Pat. No. 2,698,240), thermosetting acrylic or methacrylic polymers (U.S. Pat. No. 4,571,363), and like materials. Certain water dispersible copolyesters have also been disclosed as adhesives for laminating sheets of polyester film to one another or to sheets of nylon film as taught in U.S. Pat. Nos. 3,563,942 and 3,779,993. Corona discharge treatment is also used with and without such primer coatings to achieve adhesion between the polymeric film and the extruded polymer layer.

In common practice, polyethyleneimine is used as an adhesive coating between various polymeric films, such as polypropylene film and other polymers as taught by U.S. Pat. No. 4,139,643 to Hix et al. The use of polyethyleneimine as an adhesive between cellophane and polyethylene is known from Reissue Patent No. 28,554 issued to Curler et al. Coating polyester film with polyethyleneimine by a converter for adhesion to extruded polyethylene is generally known. However, it is known that the polyethyleneimine bond deteriorates rapidly to an unacceptable level under humid conditions. Thus, a converter will only employ polyethyleneimine, as a primer coating, when the laminate will not be exposed to prolonged humid conditions. These and other prior art applications for coating various polymeric films with polyethyleneimine are all performed by a converter rather than a film manufacturer.

In common practice for extrusion coating, a converter will corona treat polymeric film as received from the film manufacturer, coat the corona treated film with polyethyleneimine, and then extrusion coat another polymer onto the film to form a laminate. This operation in which the polyethyleneimine is coated by a converter is called "off-line" coating. For a converter to off-line coat polymeric film with polyethyleneimine requires expensive equipment. For example, a converter would need equipment to unwind the film, corona treat it, primer coat it, dry the primer coating, extrusion coat the primed film, cool the formed laminate, and rewind the film into a roll. In addition to equipment requirements, an off-line coating operation is time intensive for a converter.

Because of the above difficulties, it would be advantageous for a converter to obtain a ready-to-use treated and primed film, such that the primed film would be directly extrusion coatable without additional primer coating or corona treatment. In other words, it would be advantageous to the converter to receive a film from the manufacturer that merely required the converter to directly extrusion coat the desired polymeric material thereon to form a polymeric laminate.

A directly extrusion coatable polyester film is disclosed in U.S. Pat. No. 4,410,600 to P. T. McGrail. Disclosed is a biaxially oriented PET film coated "in-line" with a crosslinked styrene-maleic anhydride copolymer. The coated film, however, still requires corona treatment prior to extrusion coating by a converter. Coating polymeric film with a primer coating during the manufacturing process (before heat setting the film) is referred to as "in-line" coating.

None of the prior references addresses the problem of acceptable direct extrusion coatability of polymeric film, without additional primers or additional corona treatment. Moreover, none of the prior references discloses coating polyethyleneimine in-line rather than off-line as is conventionally known.

Accordingly, it is an object of this invention to provide an oriented, polymeric film which can be directly extrusion coated with other polymers, without the need for an additional primer coating or additional corona treatment, and can withstand prolonged humid conditions.

It is also an object of this invention to provide a polymeric film having a polyethyleneimine primer coating thereon in which the coating is applied in-line.

Additionally, it is an object of this invention to provide a polymeric film, in-line coated with an effective amount of polyethyleneimine, to improve ink adhesion.

SUMMARY OF THE INVENTION

These and other objects may now be achieved with the present invention, directed to a polymeric film in-line coated with polyethyleneimine to render the film receptive to direct extrusion coating with other polymers or to ink adhesion. Additionally, the process of the present invention produces an oriented polymeric film which has been in-line coated with polyethyleneimine so that it is receptive to ink adhesion for labeling or other packaging applications, or direct extrusion coating.

The polyethyleneimine must be applied during manufacturing of the polymeric film to achieve good results for ink adhesion and direct extrusion coating. The polyethyleneimine coating can be applied to polymeric film by any conventional method, such as spray coating, roll coating, miniscus coating, immersion coating, and reverse gravure coating. Once the polyethyleneimine primer coating has dried, the primed polymeric film, without further treatment, is receptive to direct extrusion coating with one or more polymers or is receptive to ink adhesion. The polyethyleneimine coating serves to bond the polymeric film to the polymer extrudate, thus forming a laminate, or to ink, for packaging applications.

In the broadest sense, the present invention is directed to a process for coating polymeric film with an effective amount of polyethyleneimine to render the film receptive to extrusion coating with one or more polymers, or to render the film receptive to ink adhesion, comprising the steps of forming a polymeric film and in-line coating the polymeric film with polyethyleneimine sufficient to improve the adhesion between the polymeric film and ink, or other polymers, the coating occurring before draw, interdraw or postdraw, but before heat setting the coated film.

In the broadest sense, the present invention also relates to a coated polymeric film capable of bonding with ink, or other polymers extruded thereon, comprising: an oriented polymeric film having an effective amount of a polyethyleneimine coating applied in-line during manufacturing of the film, sufficient to bond directly to ink or extrusion coated polymers.

DETAILED DESCRIPTION OF THE INVENTION

Generally, the polymeric films of the present invention can be any oriented thermoplastic film made from polyester, polyamide, polyolefin, polycarbonate, or the like. Preferably the films of the present invention would be based on crystallizable polyester resulting from the polycondensation of a glycol or diol such as ethylene glycol or butane diol, and mixtures thereof, with terephthalic acid or dimethyl terephthalate, or mixtures of terephthalic acid and other dicarboxylic acids such as isophthalic acid, diphenic acid, sebacic acid, or their polyester forming equivalents, as known in the art, or mixtures of dimethyl terephthalate and other dicarboxylic acids such as isophthalic acid, diphenic acid and sebacic acid, or their polyester forming equivalents, as known in the art. Polyester film useful in the present invention may be polyethylene terephthalate, polypropylene terephthalate, and polybutylene terephthalate, or mixtures of these, or copolyester films in which any one of the above mentioned polyesters is present. For example, a copolyester film of polyethylene terephthalate and isophthalate (PETIP) is well known in the art and is within the scope of the present invention. The preferred polyester film, for the purposes of the present invention, is polyethylene terephthalate (PET).

Although the present invention is directed to oriented polymeric films, a general description of polyester film will be employed to illustrate known conventional processes. For example, polyester resin may be melted and extruded as an amorphous sheet onto a polished revolving casting drum to form a cast sheet of the polymer. Thereafter, the film is heated to just above its glass transition temperature, 80° C. to 100° C., and is generally stretched or drawn in one or more directions. For example, the film may be stretched or drawn in the direction of extrusion (longitudinal direction), or perpendicular to the direction of extrusion (transverse direction), or both directions in which case biaxially oriented film is produced. The first stretching, to impart strength and toughness to the film, conventionally ranges from about 2.0 to about 5.0 times its original length. If subsequent stretchings are employed, these stretchings can also range from about 2.0 to about 5.0 times the original size of the film. The film is then heat set at a temperature range generally between 190° C. to 240° C. to "lock in" the strength, toughness and other physical properties.

The thickness of polymeric film suitable for the present invention may generally range from about 0.25 to about 10 mils or more in thickness. Preferably, packaging films of the present invention would range from about 0.35 to about 1.5 mils in thickness.

For purposes of the present invention, "in-line coating" means coating during the film manufacturing process, before heat setting the film. For purposes of the present invention, "off-line coating" means coating after the heat setting stage of film manufacturing. Off-line coating is typically done by film converters, not film manufacturers.

The preferred polyethyleneimine coating of this invention is an aqueous based solution applied in-line during one of three stages of the film manufacturing process, namely: the predraw stage, between the casting of the amorphous sheet and the first stretch, as disclosed, for example, in British Patent No. 1,411,564; the interdraw stage subsequent to the uniaxial drawing but prior to biaxially drawing, as disclosed in U.S. Pat. No. 4,571,363; or the postdraw stage subsequent to all stretching but prior to heat setting the film, as disclosed in U.S. Pat. No. 3,322,553. Normally, the heat applied to the film before the stretching and heat setting stages is sufficient to evaporate the water and other volatiles in the aqueous coating, leaving a dry coating on the film prior to winding the film. If water and other volatiles have not evaporated before stretching, a separate drying step would be required.

For uniaxially drawn film, it is preferable to coat the film during a predraw stage. For a biaxially oriented film, it is preferable to coat the film after it is stretched in one direction, but prior to stretching in the orthogonal direction.

The coating may be applied by any known coating procedure such as roll coating, spray coating, slot coating, miniscus coating, or immersion coating. In a preferred embodiment, the polymeric film is coated by means of a reverse rotating gravure roll.

Generally, it is preferred that the film be subjected to a corona discharge treatment prior to coating. In the film manufacturing process, the corona treatment typically occurs just prior to coating the film. The strength of the corona treatment to be applied to the film is well known in the art and is generally about 2.5 kilowatts per square foot per minute.

The polyethyleneimine coating of the present invention is applied as an aqueous based solution at a concentration of about 0.1 to about 25 percent by weight of the polyethyleneimine, and preferably from about 0.2 to about 6.0 percent by weight. The aqueous solution yields a final dry coating weight of about $1 \times 10^{-8}$ to $2 \times 10^{-5}$ pounds per square feet of film surface. The preferred amount of applied coating yields a final dry coating weight of about $1.0 \times 10^{-6}$ pounds per square foot of polymeric film surface.

The coating composition may also include other ingredients as long as such ingredients do not detract from the adhesion promoting action of the polyethyleneimine. Such other ingredients would include minor amounts of colloidal silica, dyes, pH regulating agents, wetting agents, and the like. Additionally, it may be helpful to add aqueous compatible solvents such as methanol to the coating solution as a drying aid or as a thinner, etc. The coating is applied on the film as a continuous coating, which term is also intended to include the situation where the coating may form a continuous film or a plurality of islands or segregated regions of the coating.

The polyethyleneimine coating of the present invention may be applied to one or both sides of the film, or it may be applied to one side and a different coating such as a thermosetting acrylic or methacrylic coating as taught in U.S. Pat. No. 4,571,363 may be applied to the opposite side.

Scrap film made during production that is coated with the polyethyleneimine coating of the present invention may be ground and mixed with fresh polymer, remelted and re-extruded to produce films for the present invention. Such film produced, containing significant quantities of primed scrap reclaim, exhibits very little degradation of physical strength properties. Color degradation can be a problem depending upon the amount of reclaimed film employed. Nevertheless, film with a relatively high amount of reclaimed film could be employed where color is not a concern, since the physical properties are not affected.

Laminates may be formed by any well known process, and particularly by direct extrusion coating where a molten sheet of polymer is continuously deposited on the coated polymeric film of the present invention, as a moving web of film. Laminates of polyester with polyethylene, ethylene-vinyl acetate copolymers, polyvinyl alcohol, polyvinyl acetate, and other polymers may be readily made by the extrusion coating process. A coated film of polyester which is extrusion coated with polyethylene has particularly useful properties such as good heat sealing capability or adhesion to other materials such as aluminum foil. The coated film of the present invention is also capable of adequately bonding to such difficult polymers as ionomer resins and particularly Surlyn ®1702, which is a zinc salt of an ethylene/organic acid copolymer produced by DuPont Company of Wilmington, De.

Laminates made with in-line coated polyethyleneimine polymeric film of the present invention are capable of withstanding retort conditions of 2 hours in water at 121° C. at 15 psi, without showing signs of any delamination between the coated film and the extrusion coated polymer. Laminates formed with off-line polyethyleneimine coated polymeric film delaminate or show signs of delamination under polyethylene or Surlyn ®1702.

The following examples are illustrative of the invention:

FILM PREPARATION

Polyethylene terephthalate (PET) polymer was melted and extruded through a slot die onto a cooled casting drum maintained at a temperature of about 20° C. The melted PET polymer solidified sufficiently to form a cast sheet. The cast sheet was longitudinally stretched at a draw ratio of approximately 3.5 to 1, at a temperature of about 80° C. The longitudinally drawn film was corona treated by a corona discharge apparatus at a strength of about 2.5 kilowatts per ft.$^2$/min., and thereafter in-line coated by reverse gravure roll with the polyethyleneimine coating prepared as described later.

The corona treated, longitudinally drawn, coated film was dried at a temperature of about 80 to 100° C., and thereafter the film was stretched in the transverse direction to a draw ratio of about 3.9 to 1 to produce a biaxially drawn film. The thickness of the biaxially drawn film was about 0.5 mil. The biaxially oriented drawn film was then heat set at a maximum temperature of about 230° C.

In comparative demonstrations using off-line coating, the heat set film was corona treated at the same level mentioned above and then coated with the same polyethyleneimine solution.

The polyethyleneimine coating was prepared by forming with ordinary tap water an aqueous solution of about 0.25 to 3 percent by weight (as specifically set forth in the examples) polyethyleneimine. The polyethyleneimine can be purchased from any commercial source, such as Mica Corporation under the trade name MICA A 131X.

To directly apply an extrusion coated polymer to the polyethyleneimine coated PET film, the polymer was melted and extruded through a slot die onto the PET film running over a cooled casting drum maintained at a temperature of about 20° C. Generally the slot die can be moved vertically with respect to the casting drum and back from top dead center, horizontally, toward the feeding direction of the PET film. For some polymers like LDPE, the position of the die slot does not greatly affect the strength of the laminate. For other polymers the position is important. After the extruded polymer solidified, the laminate was tested for bond strength.

Paper sheets were inserted into the laminate while it was being made to facilitate separating the extruded polymer from the polyester (PET). The laminate was cut into three one inch wide (about six inches long) test strips and each side of the strips were backed with one inch wide Scotch ®610 tape to keep the sample from stretching and producing false bond strengths. A Thwing-Albert Electronic Tensile Tester machine was set with the following limits:

| | |
|---|---|
| Crosshead speed | 12 inches/min. |
| Chart speed | 10 inches/min. |
| Jaw separation | 1 inch |
| Load | as required |

One end of the test strip is inserted into the upper jaw of the Thwing-Albert, while the opposite end of the test strip is inserted into the lower jaw. The upper and lower jaws are separated 1 inch. Activating the machine causes the jaws to separate from one another at a speed of 12 inches per minute. The resulting load is reported in pounds per inch of width. The three bond measurements were averaged and reported.

EXAMPLE 1

A polyester film (Hostaphan ®2400) was coated with 1 weight percent polyethyleneimine (PEI) in an aqueous solution such that the final dry coating was about $1.0 \times 10^{-6}$ pounds per square foot of polyester film. The coating occurred in-line during the film manufacturing process, interdraw with a corona treatment applied just prior to the coating. The corona treatment was conducted at 2.5 kilowatts per ft.$^2$/min as described in the film preparation description. After the coating was applied to the film, a low density polyethylene (LDPE) was laminated to the coated side of the polyester film by melting the LDPE at 305° C. and extruding it directly on a running web of the coated polyester film moving at 300 feet per min. to form a layer of LDPE approximately 10 lbs. per ream. Preferably, the die position is as far back as possible from the chill roll and the air gap is about 2 inches.

The laminate of polyester/LDPE was then tested for bond strength in pounds per inch, referencing ASTM D882. The bond strengths were determined by securing the polyester in one clamp and the LDPE in the other clamp on a Thwing-Albert, using 12 inches per minute as the cross head speed as previously described. The results are set forth in Table 1.

Additionally, the laminate was subjected to a retort test to determine delamination. The retort test was conducted for 2 hours at 121° C. and at 15 psi. The film sample size employed was approximately 7 × 10 inches in size and the amount of water in the retort was approximately 2 quarts. The results of these tests are set forth in Table 1 below.

TABLE 1

| Coating | Percent PEI In Aqueous Solution | Bond Strength (Lbs. Per Inch) | Retort Results |
|---|---|---|---|
| In-Line | 1.0 | Destruct | No Delamination |
| Off-Line | 1.0 | 1.1 | Signs of Delamination |

Each of the above results are an average of three tests. A destruct bond means that the bond strength is greater than about 3.0 pounds per inch.

EXAMPLE 2

The coated polyester film was prepared as described above in Example 1. Instead of using polyethylene as the extrusion polymer, an ionomer resin (Surlyn ®1702) was employed. The results are set forth in Table 2 below.

TABLE 2

| Coating | Percent PEI In Aqueous Solution | Bond Strength (Lbs. Per Inch) | Retort Results |
|---|---|---|---|
| In-Line | 3.0 | Destruct | No Signs of Delamination |
| Off-Line | 1.0 | 0.03 | Delamination Occurred |

The Surlyn was directly extruded onto the coated film at 227° C. at 300 feet per minute at a thickness of about 1 mil (10 lbs. per ream). The die position was as far back from the chill roll as possible and the air gap was 2 inches from the PET film (or coating drum).

A 1 percent off-line coating was tested against a 3 percent in-line coating because the 3 percent in-line coating was then stretch oriented approximately 3.5 times its original shape which would roughly equilabrate to about 1 weight percent PEI on an off-line coating procedure (where no orientation occurs after the coating).

EXAMPLE 3

Coated polyester film was prepared as described in Example 1. The concentration of PEI coating applied to the film was 0.25 percent by weight, 0.50 percent by weight, 1.0 percent by weight, or 1.5 percent by weight. A control sample having no coating on the film was also prepared for comparative purposes. Three different types of ink were applied to samples of each of the coated films with no corona treatment administered to any of the samples immediately prior to the ink application. Water based ink and solvent based ink were employed.

The water based inks were Hydrolam Blue and Hydrolam White manufactured by the Converters Ink Company in Winston Salem, N.C. The blue and white inks were mixed with a 80 percent water/20 percent isopropanol solution to obtain a viscosity between 18 and 20 seconds determined by using a No. 2 Zahn cup.

The ink was coated on the film using a Pamarco hand roller. Each of the films were coated first with the blue ink and then one portion of the sample was overcoated with the white ink. The samples were dried after each ink application in a forced-air oven at 250° F. for 45 seconds.

Ink adhesion was determined by using Scotch ®610 tape in which the tape was contacted with the ink on the PEI coated film. The tape was then removed and the amount of ink which adhered to the Scotch 610 tape as well as the amount of ink which adhered to the PEI coated polyester film was recorded. The percent ink adhesion to the PEI coated polyester film is set forth in Table 3.

The solvent based inks employed were Optiprint from Inmont Corporation in Cincinnati, Oh; and Mylex from Converters Ink Company in Linden, N.J. Both the Optiprint and Mylex ink systems (solvent based inks) were mixed with a mixture of 80 percent ethanol and 20 percent ethyl acetate. The viscosity was between 18–20 seconds as determined with a No. 2 Zahn cup. Again, each sample was coated with blue ink and then a portion of that sample was overcoated with white ink. The samples were dried in a forced-air oven at 250° F. Scotch ®610 tape was used to check adhesion as previously described. The percentage of ink adhesion on the PEI coated PET is set forth in Table 3.

TABLE 3

| % PEI | Hydrolam Blue, % | Hydrolam White/Blue, % | Optiprint Blue, % | Optiprint White/Blue, % | Mylex Blue, % | Mylex White/Blue, % |
|---|---|---|---|---|---|---|
| Control 0.0 | 35 | 93 | 30 | 30 | 50 | 80 |
| 0.25 | 100 | 100 | 100 | 100 | 100 | 99 |
| 0.50 | 100 | 100 | 100 | 95 | 100 | 100 |
| 1.0 | 100 | 100 | 99 | 95 | 99 | 99 |
| 1.5 | 100 | 100 | 99 | 99 | 100 | 95 |

RESULTS

The results indicate that significant improvement in ink adhesion is achieved when applying PEI in-line to PET film. In particular, water based blue inks had significant improvement along with oil based Optiprint inks and the blue Mylex ink.

EXAMPLE 4

Off-line coated polyester film was prepared as described in the Discussion on Film Preparation. The coating contained 1% by weight PEI in an aqueous system. The ink systems employed in Example 3 were employed here. The ink was applied on the PEI coated PET film using a Pamarco hand roller. After application of each color of ink, the samples were dried at 250°

F. for 1 min. The samples were tested for ink adhesion using Scotch®610 Tape as described in Example 3. The results of ink adhesion to the off-line coated film are set forth below in Table 4.

TABLE 4

| % PEI | Hydrolam Blue, % | Hydrolam White/Blue, % | Mylex Blue, % | Mylex White/Blue, % | Optiprint Blue, % | Optiprint White/Blue, % |
|---|---|---|---|---|---|---|
| 1% | 80 | N/A | 100 | 100 | 50 | 90 |

Comparing 1% PEI coating of Table 3 to Table 4 indicates that off-line coated PEI or PET film generally yields poorer ink adhesion compared to in-line coated PEI coated PET film.

Thus, it is apparent that there has been provided, in accordance with the invention, a polyethyleneimine coated polymeric film capable of being extrusion coated with a polymer, or coated with ink that fully satisfies the objects, aims, and advantages set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications and variations as fall within the spirit and broad scope of the invention.

What is claimed is:

1. An oriented polyester film having a coated composition on at least one side thereof, said coated, oriented polyester film comprising:
   a) oriented polyester film; and
   b) an effective amount of polyethyleneimine coating applied in-line, on said film sufficient to adhere a direct extrusion coated polymer to said polyester film and sufficient to show no signs of delamination between said film and said extrusion coated polymer after two hours in water at 121° C. at 15 psi.

2. The film of claim 1, wherein said polyethyleneimine coating is present on a dry weight basis of about $1.0 \times 10^{-8}$ to about $2.0 \times 10^{-5}$ pounds per square foot of film surface.

3. The film of claim 1, having an additional layer of an extrusion coated polymer adhered to said polyethyleneimine.

4. The film of claim 3, wherein said extrusion coated polymer is polyethylene.

5. The film of claim 3, wherein said extrusion coated polymer is an ionomer resin polymer.

* * * * *